Sept. 11, 1962 R. HAMEL 3,053,561
BOTTLE HANDLING DEVICE
Filed Dec. 7, 1960 2 Sheets-Sheet 1
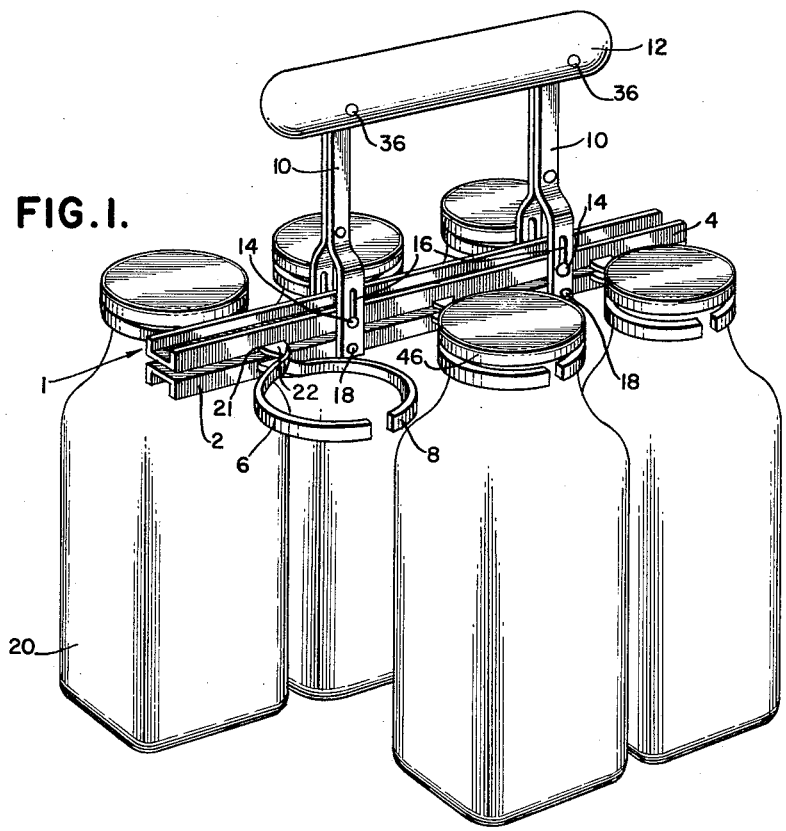
FIG.1.
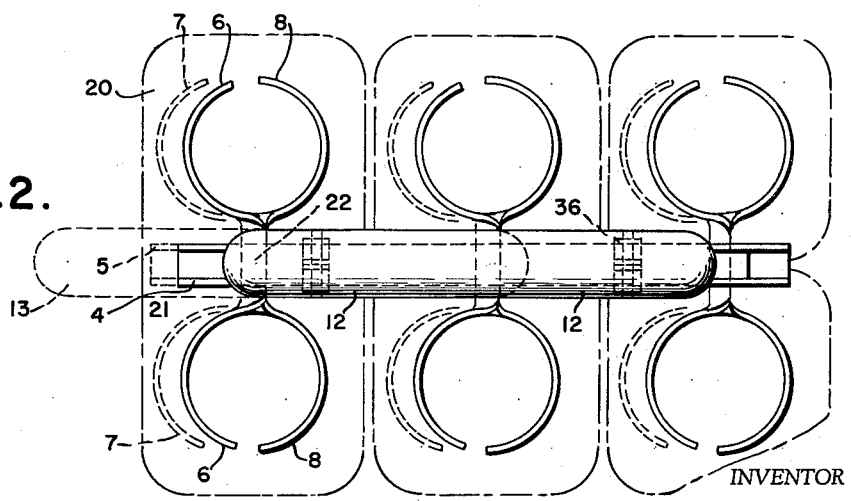
FIG.2.
FIG. 8.
INVENTOR
Richard Hamel
BY Clive H Branson
ATTORNEY Sept. 11, 1962          R. HAMEL          3,053,561
BOTTLE HANDLING DEVICE
Filed Dec. 7, 1960          2 Sheets-Sheet 2
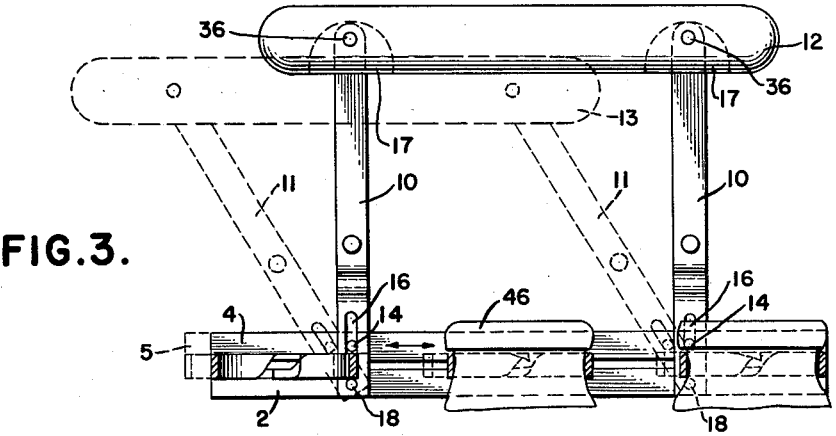
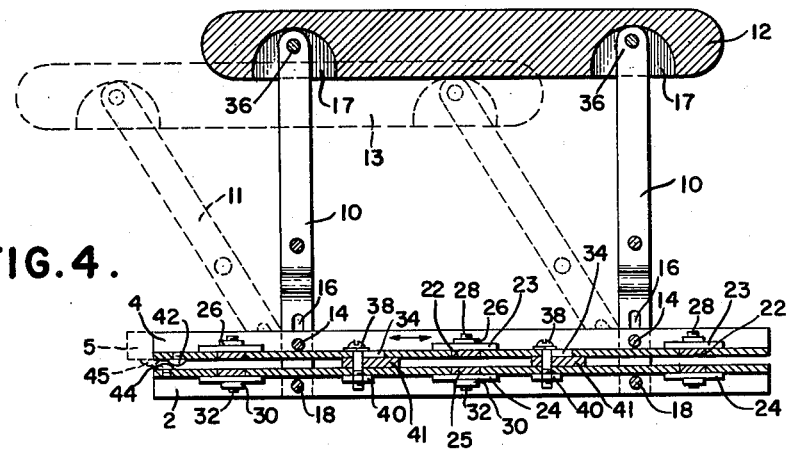
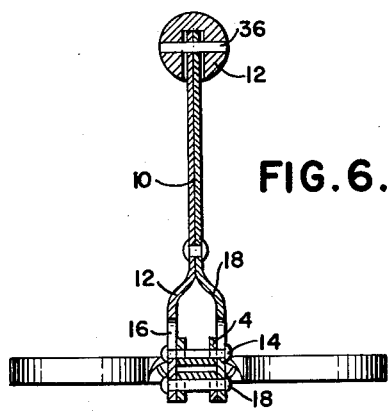
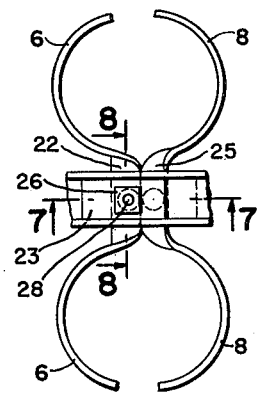
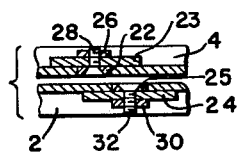
INVENTOR
Richard Hamel
BY *Clive H. Branson*
ATTORNEY

United States Patent Office 3,053,561
Patented Sept. 11, 1962

3,053,561
BOTTLE HANDLING DEVICE
Richard Hamel, 6 Algiers St., Plainview, N.Y.
Filed Dec. 7, 1960, Ser. No. 74,320
2 Claims. (Cl. 294—87.22)

This invention relates to novel and useful bottle handling apparatus and more particularly to a device for carrying and transferring bottles utilized in the dairy industry for the purpose of distribution of its products.

Objects and advantages of the invention will be set forth in part hereinafter and in part will be obvious herefrom, or may be learned by practice of the invention.

The invention consists in the novel parts, constructions, arrangements, combinations and improvements herein shown and described and belongs to the type of carriers which grip the neck of bottles immediately below their respective top peripheral heads.

The accompanying drawings referred to herein and constituting a part hereof, illustrate one embodiment of the invention, and together with the description, serve to explain the principles of the invention.

FIG. 1 is a perspective illustration of the bottle handling device with bottles positioned within five of the six jaws employed in the embodiment shown;

FIG. 2 is a plan view of the instant invention indicating the jaws of the device in both opened and closed position, milk bottles being outlined with respect to each jaw provided therefor;

FIG. 3 is a side elevation view illustrating the cooperative relation between the handle and jaws of the device;

FIG. 4 is a side elevation view of the bottle handling device the structure of the upper and lower jaw carrying members and the cooperative operation therebetween being shown;

FIG. 5 is a plan view illustrating the complementary structure of the jaws and the connective relation thereof with respect to the jaw carrying members;

FIG. 6 is an end elevation view of the bottle handling device, certain parts thereof being shown in section;

FIG. 7 is a sectional side elevation view taken along line 7—7 of FIG. 5; and

FIG. 8 is a sectional end elevation view taken along line 8—8 of FIG. 5.

The invention is directed to providing improvements in bottle carrying equipment and is particularly directed to easing the burdens of milk delivering personnel.

One object of the invention is to provide novel apparatus of the type mentioned which is convenient and quick in operation in picking up and releasing the bottles, by which it is easy to carry the bottles, and which at all times provides security against breakage of bottles.

Another object of the instant invention is the provision of a carrier enabling ready accommodation of a plurality of bottles, the carrier being of such compact dimensions as to be receivable within a small milk bottle receptacle located for convenience near home entrances, and removable from said receptacle subsequent to depositing the bottles therein.

A further object of the present invention is to provide a bottle handling device whereby milk delivery personnel may handle a plurality of bottles in a single movement and without giving each bottle individual attention as is required in the case of completely manual handling.

Another object of the invention is the provision of a device which is self locking by virtue of the weight of bottles being transferred and which contains a locking feature in addition to that aforementioned.

Still another object is to provide a bottle handling device of simple construction, which is economical to manufacture, strong, durable and unlikely to become inoperative.

It will be understood that the foregoing general objectives and the following detailed description as well are exemplary and explanatory but are not restrictive of the invention. Referring now in detail to the present preferred embodiment of the invention illustrated by way of example in the accompanying drawings, FIGURE 1 shows the bottle handling device designated generally by numeral 1 in operative position, that is, with a plurality of milk bottles secured within the jaws thereof.

A general understanding of the arrangement and location of the parts of the novel apparatus as shown in FIGURE 2 discloses the cooperation of the elements comprising the jaw members 6 and 8, six sets thereof being included in the representation. In general the elements comprising the complete apparatus consist of a pair of channel members 2 and 4 in parallel spaced relation; movable and stationary arcuate jaw members 6 and 8 respectively; vertical lever and support members 10; and handle 12.

Referring now to FIGURES 3 and 4 of the drawings it will be seen that movement of handle 12 to the left thereby converting the rectangular configuration outlined by said handle 12 and support members 10 to the rectangular configuration outlined by broken line members 13 and 11, will simultaneously move upper channel member 4 to the position designated by numeral 5.

With reference again to FIGURE 2 of the drawings, it will be seen that arcuate jaw members 6 extending through horizontal slot 21 in upper channel 4 are secured thereto at the central flat horizontal portions 22 thereof by virtue of flat-head screw 28 cover-washer 23 and nut 26 (not detail views in FIGURES 7 and 8), and that by movement of handle 12, the concave faces of jaws 6 will, through linkages provided therefor, be movable with respect to stationary jaws 8, movement being effectuated between the closed position and the opened position, the latter being shown as broken line 7.

To the end of accomplishing the above, support members 10, being bifurcated to straddle lower and upper channel members 2 and 4 respectively, are comprised of ears 12 and 18, vertical guide slots 16 being positioned therein to receive pin 14 which fastens said upper channel 4 to said support member 10 in slidable relation. Pins 18 located near the terminal ends of said ears function to fasten said ears to said lower channel 2 in pivotal relation. Pins 36, positioned within the upper ends of support members 10, fasten said support members to handle 12 in pivotal relation, partially annular portions 17 being provided within said handle thereby permitting pivotal movement therebetween as required.

As described, upper channel 4, adapted to receive a plurality of arcuate jaw members 6 is movably connected to lower channel 2, spacer means 41 being provided therebetween as bearing surfaces facilitating parallel movement between said channels. Jaw members 8, being secured to said lower channel 2 at flat horizontal portions 25 in the aforedescribed manner securing jaw members 6 to upper channel 4, i.e., by virtue of flat-head screw 32, cover-washer 24 and nut 30 (note detail in FIGURE 7), complement said jaw members 6 to complete the formation of a plurality of gripping jaws operable as shown in FIGURE 1.

Maintenance of a predetermined range of relative movement between lower and upper channels 2 and 4 is accomplished by longitudinal slots 34 positioned within the said upper channel 2, said slots being adapted to receive bolts 38 extending downwardly therethrough and continuing through holes provided in said lower channel and being fastened thereunder by nuts 40 as illustrated in FIGURE 4 of the drawings. Accordingly, while bolts 38 function as fastening means between the said lower and upper channel members, relatively free movement between said channels is maintained by suitable adjustment of said nuts 40.

Positioned endwise along the relative inwardly facing surfaces of channels 2 and 4 are raised portions 42 and 44 as seen in FIGURE 4 of the drawings. When the said jaw members 6 and 8 assume the closed position as shown in FIGURES 1 and 5, the upper raised portion 42 positioned at 45 prior to closure, will have contiguously slid over and across lower raised portion 44, thereby accomplishing locking of the jaws in the closed position.

In operation, the bottle handling device, the handle and support members thereof assuming the broken line rectangular position shown in the drawings, is placed over a plurality of milk bottles in a manner whereby jaws and bottle necks are in respective alignment. Movement of the handle and the support members of the device to the solid line rectangular position shown in the drawings will accomplish closure of the jaw members substantially surrounding the top heads 46 of the respective bottles 20. Upon lifting the plurality of bottles, the opposing forces exerted upwardly by the operator upon the handle and the downwardly directed gravitational force tend to further urge the jaw members toward closure thereby enhancing the desirability of the device. The ancillary locking effect of the raised portions heretofore described, provides a safeguard against inadvertent impact against the instant invention during the operation thereof. Release of the plurality of bottles is easily accomplished by resting the said bottles at a desired location, e.g., within a milk bottle receptacle, and by subsequent movement of the handle and support members to the broken line rectangular position by overcoming the slight resistance occasioned by the said raised portions.

It is obvious that if so desired, the bottle handling device could be extended in length so as then to have a series of more than six bottle carrying elements or operating mechanisms, thus adapting the device for handling more than six bottles and would then still operate in a substantially similar manner. It is similarly obvious that it could be made so as to be capable of carrying only a single bottle. Also it may be adapted for similarly carrying bottles other than milk bottles.

Milk delivery personnel on delivery routes must necessarily move rapidly and work fast. In carrying milk bottles by hand, two bottles are generally held in one hand with the attendant danger of breakage. Carrying baskets have been tried, but too much time is lost in transferring the bottles into and out of such baskets. The present invention obviates these difficulties with respect to both time and safety.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

What is claimed is:

1. A bottle handling device comprised of an upper and a lower channel, said channels having side walls and a bottom wall respectively, the bottom wall of said upper channel having longitudinal slots therewithin, the bottom wall of said lower channel having holes therewithin, said holes being in registry with said longitudinal slots, a bolt extending through each corresponding pair of said slots and holes, said bolts slidably connecting said channels in spaced-bottom wall to bottom wall relation, said upper and lower channels being provided with a plurality of horizontal slots positioned within the said side walls and adjacent the said bottom walls thereof, a first and second plurality of arcuate jaw members each having a central flat horizontal portion and a concave face at the ends thereof, said first and second plurality of arcuate jaw members being transversely positioned through said horizontal slots, said flat horizontal portions being fixedly secured to the respective bottom walls, the concave faces of the first plurality of arcuate jaw members being movably positioned with respect to the concave faces of the second plurality of arcuate jaw members, said second plurality of arcuate jaw members being arranged to respectively complement each of said second plurality of arcuate jaw members; a handle having downwardly facing milled portions, at least two support members having upper and lower ends, said upper ends being pivotally connected within said downwardly facing milled portions, said lower ends being bifurcated and adapted to straddle said upper and lower channels, a vertical guide slot positioned within the upper portion of each of the said bifurcated lower ends, and a hole positioned within the lower portion of each of the said bifurcated lower ends, pins connecting the upper and lower portions of said bifurcated lower ends to said upper and lower channels respectively; whereby elevation of the said handle will result in movement of said first plurality of arcuate jaw members toward said each of said second plurality of arcuate jaw members.

2. A bottle handling device comprised of an upper and a lower channel, said channels having side walls and a bottom wall respectively, the bottom wall of said upper channel having longitudinal slots therewithin, the bottom wall of said lower channel having holes therewithin, said holes being in registry with said longitudinal slots, a bolt extending through each corresponding pair of said slots and holes, said bolts slidably connecting said channels in spaced-bottom wall to bottom wall relation, said upper and lower channels being provided with a plurality of horizontal slots positioned within the said side walls and adjacent the said bottom walls thereof, a first and second plurality of arcuate jaw members each having a central flat horizontal portion and a concave face at the ends thereof, said first and second plurality of arcuate jaw members being transversely positioned through said horizontal slots, said flat horizontal portions being fixedly secured to the respective bottom walls, the concave faces of the first plurality of arcuate jaw members being movably positioned with respect to the concave faces of the second plurality of arcuate jaw members, said second plurality of arcuate jaw members being arranged to respectively complement each of said second plurality of arcuate jaw members; a handle having downwardly facing milled portions, at least two support members having upper and lower ends, said upper ends being pivotally connected within said downwardly facing milled portions, said lower ends being bifurcated and adapted to straddle said upper and lower channels, a vertical guide slot positioned within the upper portion of each of the said bifurcated lower ends, and a hole positioned within the lower portion of each of the said bifurcated lower ends, pins connecting the upper and lower portions of said bifurcated lower ends to said upper and lower channels respectively, an upper and lower raised portion projecting from the bottom walls of said upper and lower channels respectively, said upper and lower raised portions being disposed in contiguous slide-over relation; whereby elevation of the said handle will result in movement of said first plurality of arcuate jaw members toward each of said second plurality of arcuate jaw members.

References Cited in the file of this patent
UNITED STATES PATENTS

| | | |
|---|---|---|
| 2,133,877 | Stevenson | Oct. 18, 1938 |
| 2,212,237 | Jenkins | Aug. 20, 1940 |
| 2,609,227 | Medill et al. | Sept. 2, 1952 |
| 2,697,628 | Burke et al. | Dec. 21, 1954 |